US006056908A

United States Patent [19]
Petrosky et al.

[11] Patent Number: 6,056,908
[45] Date of Patent: May 2, 2000

[54] INTEGRATED TRANSMISSION CONTROL SYSTEM

[75] Inventors: Gregg W. Petrosky, Warren, Mich.; Brian C. Fagan, Oregon, Ill.

[73] Assignee: Borg-Warner Automotive, Inc., Troy, Mich.

[21] Appl. No.: 09/121,495

[22] Filed: Jul. 23, 1998

Related U.S. Application Data

[62] Division of application No. 08/740,602, Oct. 31, 1996, Pat. No. 5,823,071.
[51] Int. Cl.[7] .............................. D01F 5/32; F16H 57/02; H01K 3/00
[52] U.S. Cl. .................................. 264/272.14; 74/606 R; 29/849; 137/884
[58] Field of Search .................. 264/272.14, 272.17, 264/272.18, 272.2; 74/606 R; 137/883, 884, 596.17, 238; 29/849, 848, 855, 841, 25.42

[56] References Cited

U.S. PATENT DOCUMENTS

| | | |
|---|---|---|
| 4,109,373 | 8/1978 | Fennessy et al. .......................... 29/588 |
| 4,294,282 | 10/1981 | McCabe et al. . |
| 4,424,617 | 1/1984 | Fanning et al. ......................... 29/25.42 |
| 4,783,049 | 11/1988 | Northman et al. ................. 251/129.14 |
| 4,805,490 | 2/1989 | Fuehrer et al. . |
| 4,815,496 | 3/1989 | Nishitani et al. . |
| 4,841,274 | 6/1989 | Yagher et al. ............................. 338/28 |
| 4,893,652 | 1/1990 | Nogle et al. . |
| 5,009,125 | 4/1991 | Machida et al. . |
| 5,015,106 | 5/1991 | Robertson et al. . |
| 5,035,158 | 7/1991 | Leigh-Monstevens . |
| 5,142,940 | 9/1992 | Hasegawa . |
| 5,204,044 | 4/1993 | Yoneshige .......................... 264/272.15 |
| 5,234,033 | 8/1993 | Stoll et al. . |
| 5,286,426 | 2/1994 | Rano et al. ..................... 264/272.14 X |
| 5,337,588 | 8/1994 | Chhatwal ....................... 264/272.14 X |
| 5,466,055 | 11/1995 | Schmitt et al. . |
| 5,474,108 | 12/1995 | Inden et al. . |
| 5,522,431 | 6/1996 | Bonacorsi et al. . |
| 5,681,356 | 10/1997 | Barak et al. .................... 264/272.17 X |
| 5,749,143 | 5/1998 | Guillot et al. ............................. 29/841 |
| 5,755,027 | 5/1998 | Impey ....................................... 29/849 |
| 5,761,804 | 6/1998 | Adachi ..................................... 29/855 |

FOREIGN PATENT DOCUMENTS

| | | | |
|---|---|---|---|
| 1074923 | 4/1980 | Canada ............................. 264/272.14 |
| 4-729 | 1/1992 | Japan ................................ 264/272.17 |
| 2110587 | 6/1983 | United Kingdom .............. 264/272.14 |

Primary Examiner—Vinh T. Luong
Attorney, Agent, or Firm—Harness, Dickey & Pierce; Greg Dziegielewski

[57] ABSTRACT

A method for forming an integrated solenoid circuit system for a motor vehicle transmission. The method includes the steps of providing a solenoid sensor for sensing vehicle transmission states, and a manifold for powering the solenoid sensor, fabricating an electronic circuit to selectively connect the manifold and the solenoid sensor in response to sensed vehicle transmission states, configuring the electronic circuit into a predetermined configuration and molding a housing over the electronic circuit to form a single electrically insulated system construction.

7 Claims, 6 Drawing Sheets

INTEGRATED TRANSMISSION CONTROL SYSTEM

This is a division of U.S. patent application Ser. No. 08/740,602, filed Oct. 31, 1996 now U.S. Pat. No. 5,823,071 issued on Oct. 20, 1998.

BACKGROUND OF THE INVENTION

Conventional transmission control systems typically include a plurality of solenoid actuated valves for controlling various transmission hydraulic fluid pressures in response to particular transmission conditions. Each of the solenoids include a terminal that, when energized, actuates an assembly pin that communicates the transmission condition to a transmission controller, as is generally disclosed in U.S. patent application Ser. No. 4,893,652 to Nogle, et al, assigned to Chrysler Motors Corporation and incorporated herein by reference. The selective actuation of the pins indicate to the controller the present transmission state, such as park, reverse, neutral or drive modes. The controller processes this information for transmission control purposes as is well known in the art.

While the above transmission control systems have desirable performance characteristics, there is still room for further improvement in the art. In particular, the components required for realization of the system are typically discrete components which are interconnected through seals and connectors. The seals and connectors add to overall transmission control system expense and assembly requirements. In addition, each of the components requires separate insulation from the transmission housing.

Therefore, it is an object of the present invention to provide an integrated transmission control system that minimizes the number of system components required for system assembly and operation.

It is a further object of the present invention to provide a glass filled polyester overmolded transmission range sensor circuit and subhousing integrally attached to a solenoid subhousing and being electrically insulated from a transmission housing to which both subhousings are mounted.

SUMMARY OF THE INVENTION

The present invention provides an integrated transmission control system that combines a plurality of heretofore separate transmission control system components into a single piece construction. The system includes a glass filled polyester overmolded circuit that houses a plurality of solenoid circuits, pressure switches, resistors, a thermistor and transmission range sensor components. By combining the transmission control system components into a single piece assembly, system cost, assembly and components required for system implementation are reduced.

In particular, the present invention provides an integrated solenoid circuit assembly for a motor vehicle transmission comprising a housing including a transmission connector subhousing and a transmission range sensor (TRS) subhousing. The system also includes solenoid sensing means operatively located in the transmission connector subhousing for sensing activation of transmission solenoids. A plurality of transmission sensors is operatively positioned in the transmission range sensor subhousing for communicating transmission states sensed by the solenoid sensing means to a controller. A manifold is operatively mounted in the transmission connector subhousing for selectively energizing system components. A transmission sensor circuit operatively connects the transmission sensors to the manifold for selective activation of each of the transmission sensors in response to a particular sensed transmission state. The system integrates the transmission sensors, and the transmission sensor circuit into a single piece construction.

BRIEF DESCRIPTION OF THE DRAWINGS

The various features and advantages of the present invention will become apparent to one skilled in the art upon reading the following specification and upon reference to the drawings, in which.

DETAILED DESCRIPTION OF THE PREFERRED EMBODIMENT

Figure 1:
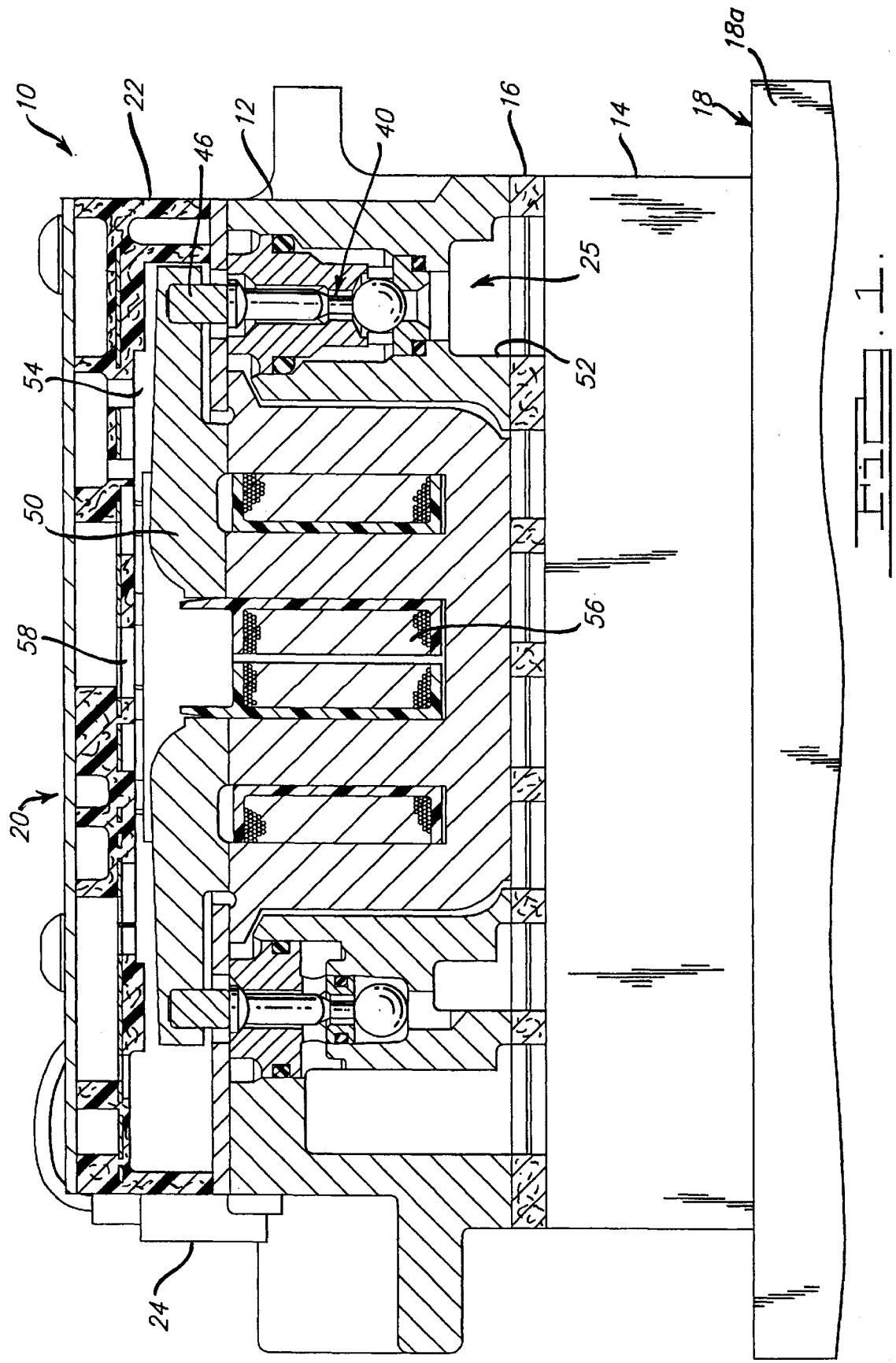
FIG. 1 is a side cross-sectional view of a motor vehicle manifold assembly in which the integrated solenoid circuit assembly taken through line 1—1 in FIG. 4 of the present invention is located.

Referring to FIG. 1, a cross-sectional view of a motor vehicle manifold assembly is shown generally at 10. The manifold assembly 10 includes a solenoid housing 12 affixed to a solenoid valve body 14. The solenoid housing 12 communicates with the valve body 14 through a plastic filter plate 16 that filters particulates out of hydraulic fluid passing through the filter plate 16. The valve body 14 in turn is operatively associated with an engine transmission, shown generally at 18, as is well known in the art and which includes a transmission housing 18a.

As shown in FIG. 1, an integrated solenoid circuit overmold assembly 20 according to a preferred embodiment of the present invention is attached to the solenoid housing 12. The assembly 20, shown clearly in FIG. 2, integrates a plurality of transmission control system components into a single insulated housing 22, thereby eliminating the need for additional components such as seals and connectors typically required when the system is configured with separately mounted components. The assembly housing 22 is preferably formed from glass filled polyester. However, any nonconductive insulating material may be used to form the housing 22. A snap connector 24 snaps into a valve (not shown) that controls the supply pressure to the automatic transmission fluid, indicated generally at arrow 25, as is well known in the art. Alternatively, a valve energization circuit to control supply pressure to the automatic transmission fluid may be used. Additionally, a manifold 26 associated with the assembly 20 connects the assembly 20 to the automatic transmission 18 in a manner well known in the art, to energize the assembly components, as will be described in more detail below.

Referring again to the solenoid housing 12, shown in FIG. 1, the solenoid housing 12 includes a plurality of ball and plunger combinations, such as that shown at 40, for selectively controlling the flow of the hydraulic fluid 25 through the housing 12. The ball and plunger combination 40 is operatively associated with a pin 46 press fit into an armature 50. The armature 50 controls axial movement of the ball and plunger combination 40, and thus flow of hydraulic fluid 25 through an inlet port 52 and into the hydraulic fluid passage 54. The armature 50 is controlled in turn by selective energization of a solenoid, such as that shown at 56, which includes a solenoid terminal 58.

It should be appreciated that the operation of all solenoid/plunger/ball combinations housed in the solenoid housing 12, shown in FIG. 1, are substantially identical in structure and function to the specifically referenced components described above. The structure and function of the components within the solenoid housing 12 is described generally in U.S. Pat. No. 4,893,652 to Nogle, et al, which has been incorporated by reference.

Referring again to FIG. 2, the integrated solenoid circuit assembly 20 according to the present invention is shown in more detail. The assembly 20 includes an electronic circuit 60, which is preferably fabricated from beryllium copper, molded into the insulator assembly housing 22 through an overmolding process described in more detail below. The housing 22 includes two main subhousings: a solenoid subhousing 62 and a transmission range sensor (TRS) subhousing 64. The circuit 60 extends through both subhousings 62 and 64 and is configured to include angled portions 65a, 65b separated by a substantially non-angled portion 65c in the TRS subhousing 64 for purposes described below. The structure of each of the subhousings 62 and 64 will be described now in more detail.

Figure 3:
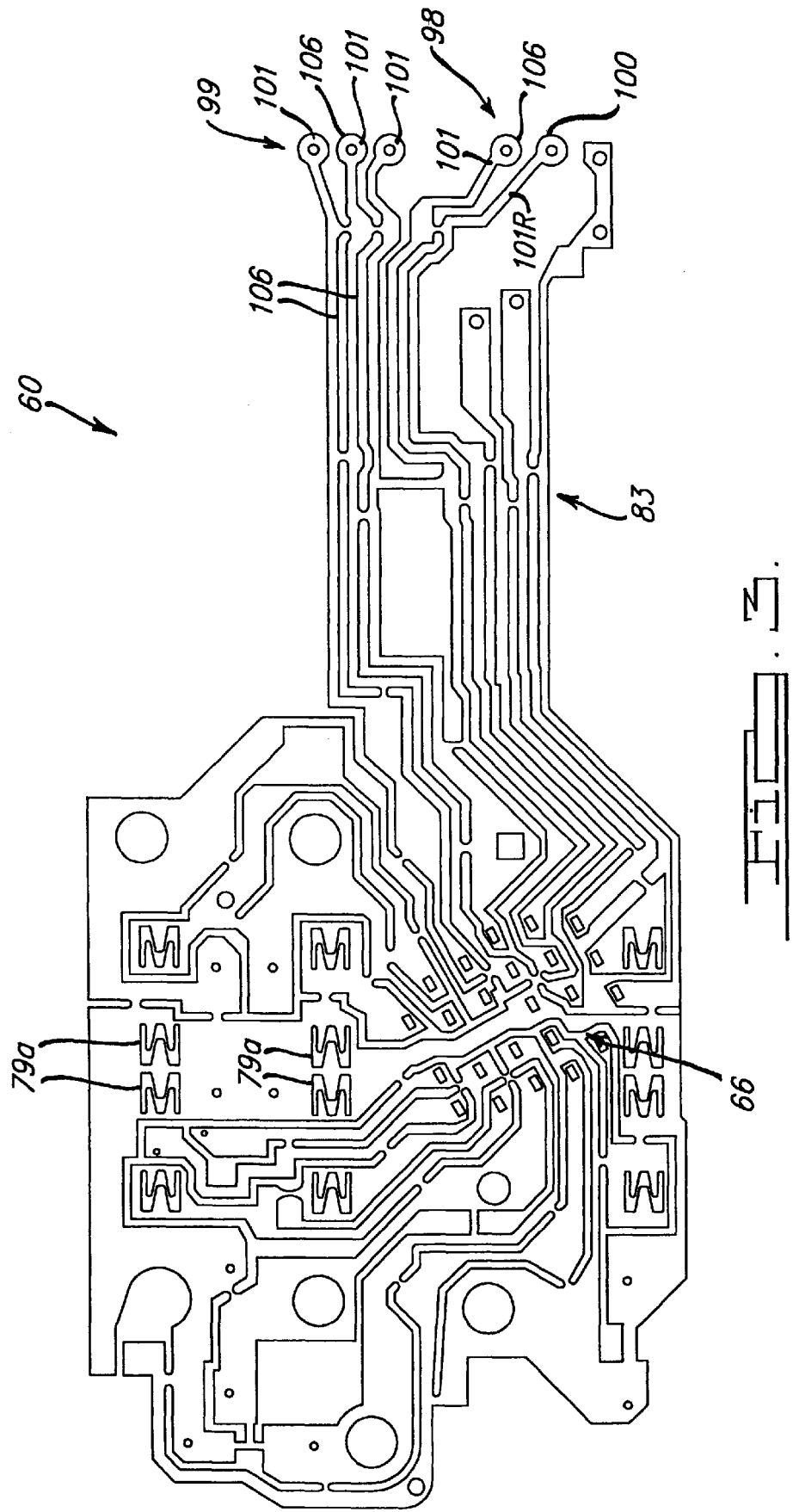
FIG. 3 is a plan view of the assembly circuit shown in phantom in FIG. 2.
Figure 4:
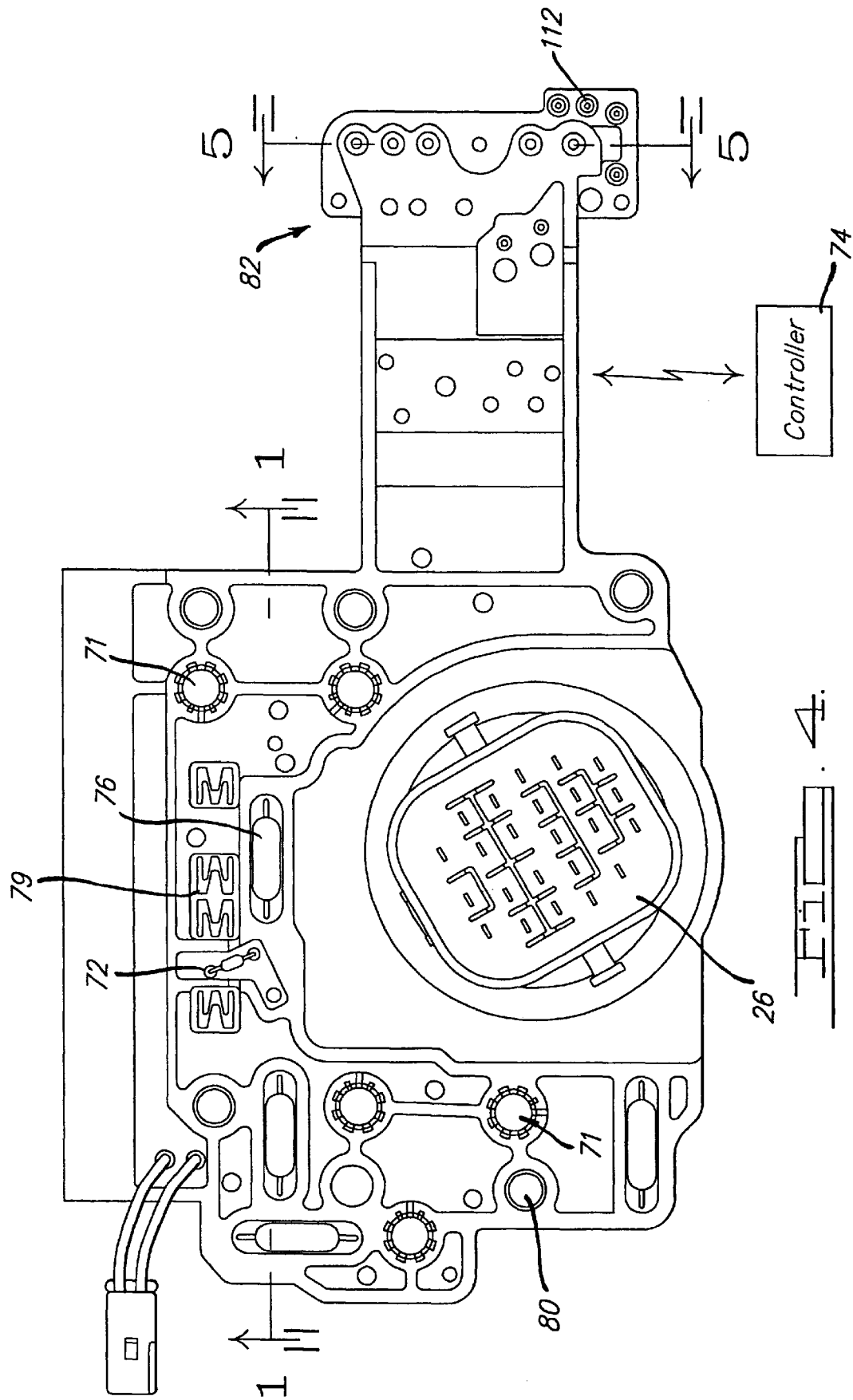
FIG. 4 is a plan view of the integrated solenoid circuit assembly shown in FIG. 2.

As shown in FIGS. 3 and 4, the solenoid subhousing 62 includes a portion of the circuit 60, shown generally at 66, that electrically connects solenoid terminals 58 with the manifold 26. Through this connection, the solenoids, such as that shown in 56, are energized through the manifold. The solenoid subhousing 62 also houses pressure switches, such as the pressure switch 71, that function to indicate particular transmission conditions in a manner well known in the art. The subhousing 62 also houses a thermistor 72 that monitors transmission fluid temperature for a controller 74 for transmission control purposes, as is well known in the art. Additionally, the subhousing includes resistors, such as the resistor 76, for reducing current level input to the manifold from the solenoids 56. The subhousing 62 additionally includes a plurality of M slots 79 through which the solenoid terminals 58 extend and electrically contact the circuit tracks 79a of the assembly circuit, (see FIG. 3) such that, when a particular solenoid is energized, the manifold conveys a signal from the solenoid terminal to components in the TRS subhousing 64. The solenoid subhousing 62 additionally includes a plurality of screw openings or apertures, such as that shown at 80, for connecting the subhousing 62 to the solenoid valve body 14.

Figure 2:
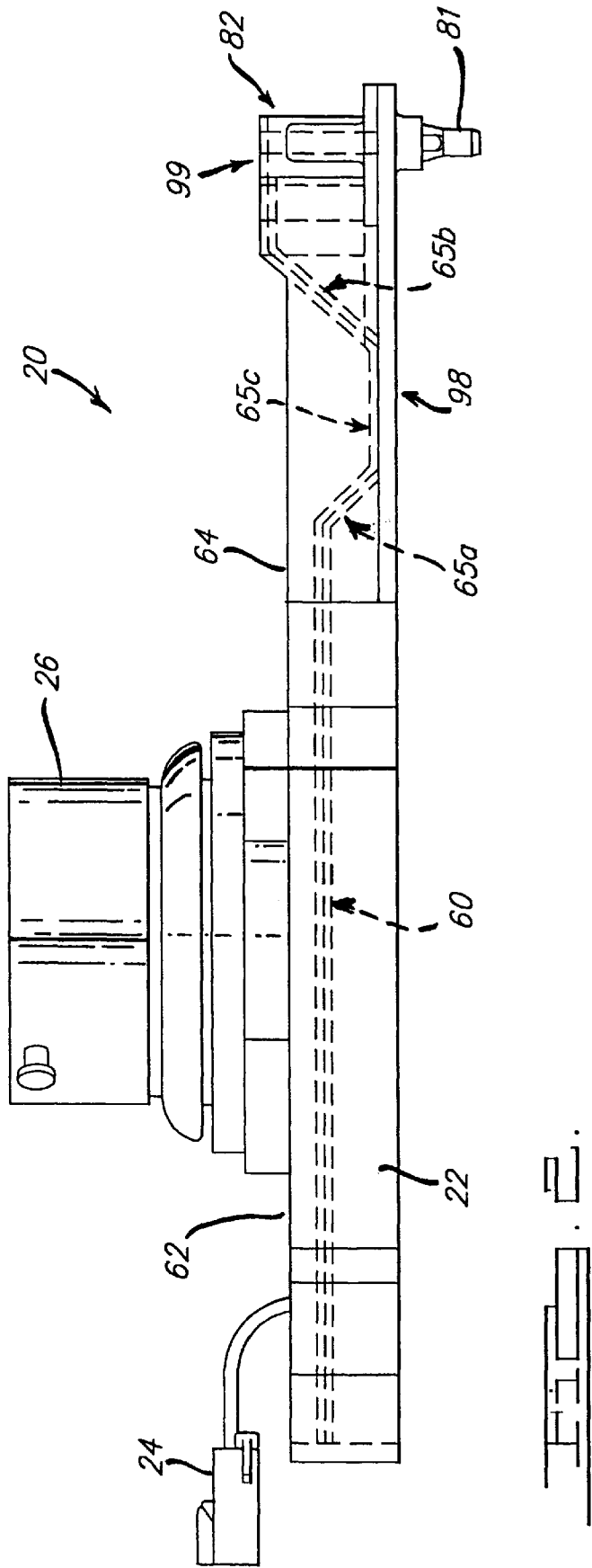
FIG. 2 is a side elevation view of the integrated solenoid circuit assembly of the present invention showing the assembly circuit in phantom.
Figure 5:
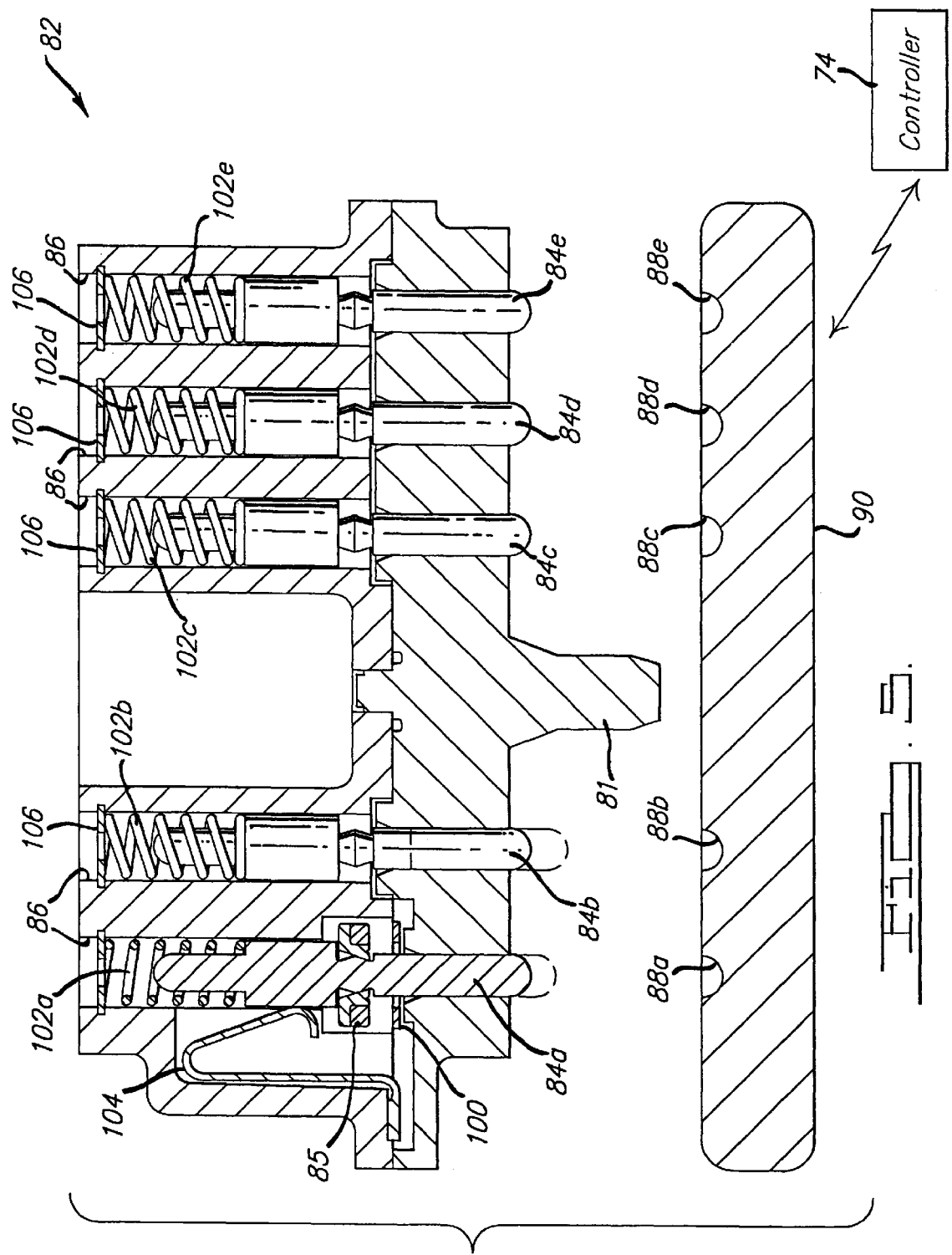
FIG. 5 is a cross sectional view of the integrated solenoid circuit assembly taken through line 5—5 in FIG. 4.
Figure 6:
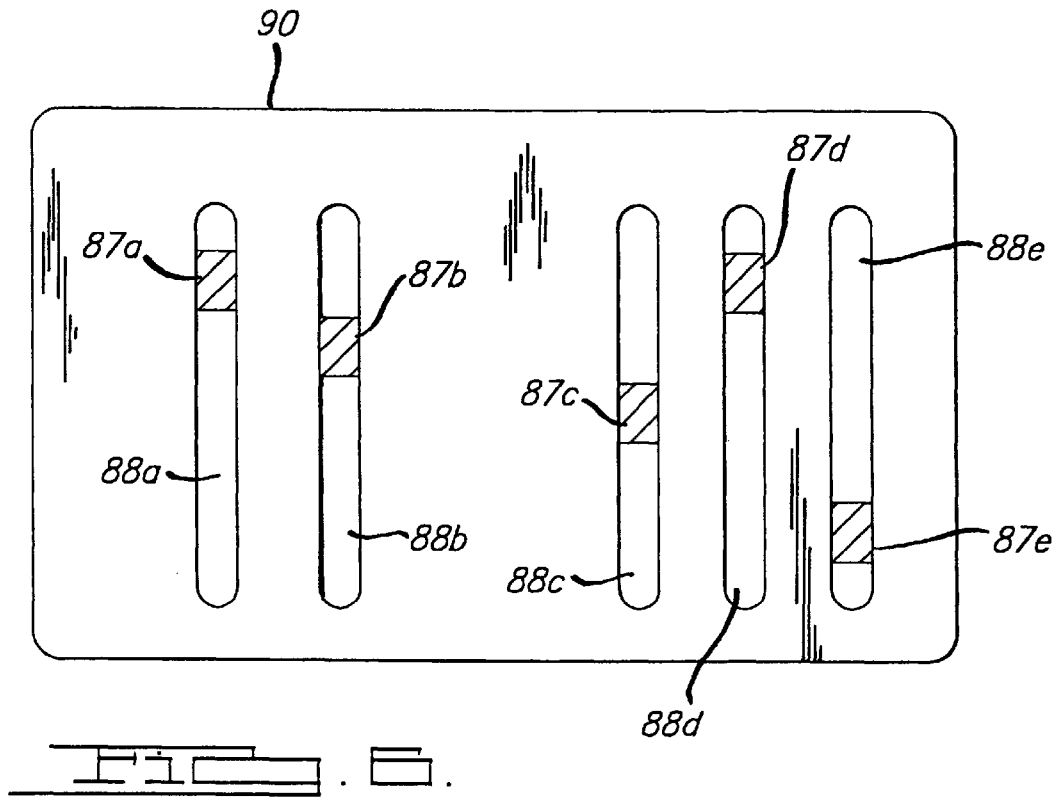
FIG. 6 is a plan view of the sliding plate shown in FIG. 5.

As shown in FIG. 2, the TRS subhousing 64 is secured to the valve body 14, via a positioning pin 81 affixed to a TRS subhousing neck 82 and fitted into a cooperating bore (not shown) in the valve body 14. As will be described in more detail below, the TRS subhousing 64 includes a plurality of solenoid indicator pins 84a–e housed within pin cylinders 86 formed in the TRS subhousing neck 82, as shown in FIG. 5. The pins 84a–e sense the vehicle transmission mode (park, reverse, neutral, drive) and are selectively actuated into contact with the conductive contact 87 in cooperating grooves 88a–e in a sliding plate 90. The pin 84a includes a washer/retainer assembly 85 that, when in contact with the circuit track 100, completes a reverse mode subcircuit 101R that turns on a vehicle reverse light (not shown). The sliding plate 90, which is operatively positioned below the pins 84a–e and shown in detail in FIG. 6, signals the present transmission state to the controller 74 through a plurality of transmission mode subcircuits 101 upon one or more of the pins 84-*a–e* electrically contacting its corresponding conductive contact 87-*a–e*.

Referring in more detail to FIGS. 3–5, the structure of the TRS subhousing 64 will be described in more detail. The TRS circuit portion 83 is formed in two segments 98, 99. The first segment 98 includes a circuit track 100 that connect the transmission reverse mode sensor pin 84a to the manifold. The circuit track 100, in combination with spring 102a positioned around the pin, selectively actuate the pin 84-*a–e* 84a into contact with the conductive groove 87a in the sliding plate 90 (see FIG. 6) upon shifting of the automatic transmission into a reverse mode of operation. The contact of the pin 84a with the groove 87a also actuates a vehicle reverse light through the washer/retainer assembly 85. Also, a leaf spring 104 acts as a grounding circuit to allow the vehicle to be started in only park or neutral modes by providing an alternate manifold return path for high current flowing through the plunger 84a.

The second segment 99 includes circuit tracks 106 which are formed to connect the pins 84b–e which are biased to a normally open position by the springs 102b–e with the manifold to signal the occurrence of a shift of the transmission into other transmission modes, such as park, neutral and drive modes upon energization of the solenoids corresponding to the particular transmission mode. In addition, the TRS subhousing 64 includes a plurality of circuit rivets 112 for attaching the circuit not overmolded into the TRS subhousing 64.

It should be appreciated at this point that the numerous components housed within the two subhousings 62, 64 which have in the past been assembled as a plurality of discrete components, have been integrated in the present invention into a single piece construction. The integrated single piece construction reduces overall system assembly and cost requirements and the number of components required to fabricate the system.

Figure 7:
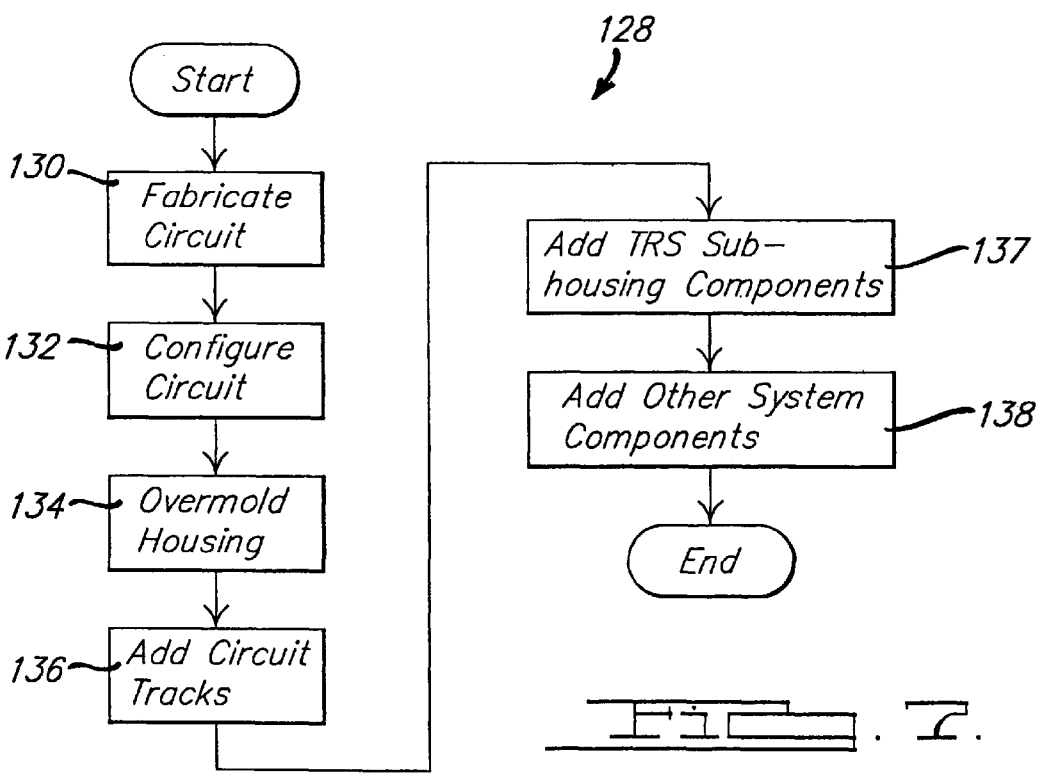
FIG. 7 is a flow diagram illustrating the steps involved in fabricating the integrated solenoid circuit assembly of the present invention.

Referring now to the flow diagram at 128 in FIG. 7 and to FIGS. 2 3, a preferred method of fabricating the solenoid circuit assembly 20 of the present invention will now be described. At step 130, the circuit 60 shown in FIG. 3 is fabricated. At step 132, the circuit 60 is stamped into a configuration having a profile such as that shown in phantom in FIG. 2. In particular, the circuit 60 is stamped to form the segment of the circuit 65a at a 45° downward angle in the neck of the TRS subhousing 64 for a predetermined length. The non-angled segment of the circuit 65c extends outwardly from the angled segment 65a. The segment of the circuit 65b is also configured at an upward angle of preferably about 45° with respect to the non-angled segment 65c. The circuit 60 then extends through the TRS subhousing neck 82 to the points of connection with the pins 84a–e. The circuit 60 is formed in this manner to provide proper spacing for loading of the springs 102a–e and pins or plungers 84a–e.

At step 134, the housing 22 is overmolded onto the circuit 60, thereby electrically insulating the circuit 60 and providing a base for mounting the circuit 60 to the solenoid housing 12. After the housing 22 is overmolded onto the circuit 60, the additional circuit track 100 for the reverse mode sensor pin 84a is riveted to the overmolded circuit at step 136. Alternatively, these additional circuit tracks may be soldered or welded onto the circuit tracks after the housing overmolding process. At step 137, pins 84*a–e* and springs 102*a–e* are inserted within pin cylinders 86*a–e*, and positioning pin 81 is affixed to the TRS subhousing 64. Referring particularly to reverse pin 84*a*, the washer/retainer assembly 85 is pressed onto the pin 84*a*, the spring 102*a* is dropped into the cylinder 86, the plunger pin 84*a* is inserted within the cylinder 86, and the circuit track 100 is electrically connected as described above. At step 138, after the additional circuit track 100 is added, the system components, such as pressure switch components, resistors, the thermistor, are added to the housing 22 in electrical connection with the circuit 60 to complete the system combination.

As can be appreciated from the foregoing description, the solenoid circuit assembly 20 of the present invention is integrated into a single housing 22 for mounting and installation into a motor vehicle transmission for transmission control purposes. The assembly housing 22, by being overmolded over the assembly circuit 60, insulates the circuit 60 as well as other system components. At the same time, the assembly 20 of the present invention reduces the number of components, and associated cost and assembly requirements, associated with like non-integrated motor vehicle transmission control systems.

While the above detailed description describes the preferred embodiment of the present invention, the invention is susceptible to modification, variation and alteration without deviating from the scope and fair meaning of the subjoined claims.

What is claimed is:

1. A method for forming an integrated solenoid assembly for a motor vehicle transmission, the method for forming the integrated solenoid assembly comprising the steps of:

providing a solenoid sensor for sensing vehicle transmission states, and a manifold for powering said solenoid sensor;

fabricating an electronic circuit to selectively connect the manifold and the solenoid sensor in response to sensed vehicle transmission states;

configuring said electronic circuit into a predetermined configuration; and molding a housing over said electronic circuit to form a single electrically insulated system construction.

2. The method of claim 1, wherein said step of molding said housing comprises forming an assembly housing including a solenoid subhousing, and a transmission range sensor subhousing extending from said solenoid subhousing and including a plurality of sensor pin cylinders; and housing a plurality of sensor pins within said plurality of sensor pin cylinders, said sensor pins being in electrical communication with said solenoid sensor via said electronic circuit.

3. The method of claim 2, further comprising the step of inserting a plurality of springs into communication with said plurality of sensor pins in said transmission range sensor subhousing to bias said plurality of sensor pins to an open circuit position.

4. The method of claim 2, further comprising the step of connecting a positioning pin on said transmission range sensor subhousing to affix said transmission range sensor subhousing to a transmission housing.

5. The method of claim 1, wherein said step of configuring said electronic circuit comprises configuring said electronic circuit so that at least one reverse mode subcircuit is offset from additional transmission mode subcircuits.

6. The method of claim 1 further comprising the step of electrically connecting a plurality of circuit tracks to said electronic circuit after said step of molding said housing.

7. The method of claim 1, wherein said step of configuring said electronic circuit comprises stamping a first segment of said electronic circuit in said transmission range sensor subhousing to be downwardly offset at an angle of about 45° with respect to said electronic circuit in said solenoid subhousing;

forming a second substantially non-angled segment after said downwardly offset first segment in said transmission range sensor subhousing;

stamping said electronic circuit after said second segment that is upwardly offset at an angle of about 45° with respect to said second segment of said electronic circuit;

forming a third non-angled segment after said second segment in said transmission range subhousing for communicating sensed transmission states to a transmission controller; and connecting an additional circuit track to said electronic circuit along said third segment that is substantially co-planar with said electronic circuit second segment.

* * * * *